US011427168B2

(12) United States Patent
Johnson et al.

(10) Patent No.: US 11,427,168 B2
(45) Date of Patent: Aug. 30, 2022

(54) BRAKE SYSTEM FOR A VEHICLE

(71) Applicant: Caterpillar SARL, Geneva (CH)

(72) Inventors: Steven Johnson, Metamora, IL (US); Adam Adeeb, Seaham (GB)

(73) Assignee: Caterpillar SARL, Geneva (CH)

( * ) Notice: Subject to any disclaimer, the term of this patent is extended or adjusted under 35 U.S.C. 154(b) by 327 days.

(21) Appl. No.: 16/741,155

(22) Filed: Jan. 13, 2020

(65) Prior Publication Data

US 2021/0213917 A1      Jul. 15, 2021

(51) Int. Cl.
| | | |
|---|---|---|
| *B60T 8/17* | (2006.01) | |
| *B60T 8/1755* | (2006.01) | |
| *B60T 7/12* | (2006.01) | |
| *B60T 15/02* | (2006.01) | |
| *B60T 8/32* | (2006.01) | |
| *B60T 7/04* | (2006.01) | |

(52) U.S. Cl.
CPC .............. *B60T 8/1701* (2013.01); *B60T 7/12* (2013.01); *B60T 8/1755* (2013.01); *B60T 8/321* (2013.01); *B60T 15/028* (2013.01); *B60T 7/04* (2013.01); *B60T 2240/00* (2013.01); *B60T 2260/09* (2013.01); *B60T 2270/10* (2013.01); *B60T 2270/306* (2013.01)

(58) Field of Classification Search
CPC .... B60T 8/1701; B60T 8/1708; B60T 8/1769; B60T 8/321; B60T 15/028
See application file for complete search history.

(56) References Cited

U.S. PATENT DOCUMENTS

| | | |
|---|---|---|
| 6,692,090 B1 | 2/2004 | Heyn et al. |
| 8,919,891 B2 | 12/2014 | McCann et al. |
| 2005/0096183 A1 | 5/2005 | Watanabe et al. |
| 2014/0117750 A1 | 5/2014 | McCann et al. |
| 2015/0323070 A1 | 11/2015 | Neil et al. |
| 2018/0056953 A1 | 3/2018 | Kato |
| 2019/0366997 A1* | 12/2019 | Jeong ................... B60T 13/745 |

FOREIGN PATENT DOCUMENTS

| | | | |
|---|---|---|---|
| CN | 110155015 A | * | 8/2019 |
| CN | 110525399 A | * | 12/2019 |
| DE | 29715289 U1 | | 11/1997 |
| GB | 2319636 A | | 5/1998 |

OTHER PUBLICATIONS

Search Report for related United Kingdom Application No. 1814815.5; dated Dec. 10, 2018.

\* cited by examiner

*Primary Examiner* — Melanie Torres Williams (57) ABSTRACT

The present invention pertains to a brake system for a vehicle, in particular a wheeled vehicle, comprising a control unit configured to operate the brake system in an automatic retarding control mode and in a brake assist mode, a brake pedal valve, and at least one brake valve unit for actuating a brake actuator. The break valve unit comprises a brake valve for applying pressurized fluid to the brake actuator in response to a control pressure applied to a hydraulic actuator of the brake valve, a blocking valve for controlling application of pressurized fluid from the brake pedal valve to the hydraulic actuator of the brake valve, and a brake pressure control valve for controlling application of pressurized fluid to the hydraulic actuator of the brake valve.

11 Claims, 4 Drawing Sheets

BRAKE SYSTEM FOR A VEHICLE

CROSS-REFERENCE TO RELATED APPLICATION

This application claims priority under 35 USC § 119 and the Paris Convention to United Kingdom Patent Application No. 1900726.9 filed on Jan. 18, 2019.

TECHNICAL FIELD

The present invention pertains to a brake system for a vehicle, in particular an articulated vehicle, and a vehicle, in particular an articulated vehicle, equipped with such a brake system.

TECHNOLOGICAL BACKGROUND

Brake systems for articulated vehicles, in particular articulated trucks, are known which are equipped with brake assist functions being automatically performed, i.e. by means of a control unit or a controller.

For example, form U.S. Pat. No. 8,919,891 B2, an electrohydraulic antilock brake system is known, in which an antilock brake control function is implemented for preventing wheels of a vehicle from slippage or lockup, thereby avoiding loss of directional stability of the vehicle.

Further, U.S. Pat. No. 5,983,149 A discloses a brake system of a work vehicle having an automatic retarding control function for automatically actuating brakes of the vehicle so as to control vehicle speed, e.g. on downhill grades.

SUMMARY OF THE INVENTION

Starting from the prior art, it is an objective to provide a new brake system for a vehicle which is equipped with brake assist functions.

This objective is solved by means of a brake system with the features of claim 1 and a vehicle, in particular a wheeled vehicle, with the features of claim 17. Preferred embodiments are set forth in the present specification, the Figures as well as the dependent claims.

BRIEF DESCRIPTION OF THE DRAWINGS

The present disclosure will be more readily appreciated by reference to the following detailed description when being considered in connection with the accompanying drawings in which:

FIG. 2b schematically shows an enlarged view of section IIb depicted in FIG. 2a; and FIG. 2c schematically shows an enlarged view of section IIc depicted in FIG. 2a.

DETAILED DESCRIPTION OF PREFERRED EMBODIMENTS

In the following, the invention will be explained in more detail with reference to the accompanying figures. In the Figures, like elements are denoted by identical reference numerals and repeated description thereof may be omitted in order to avoid redundancies.

Figure 1:
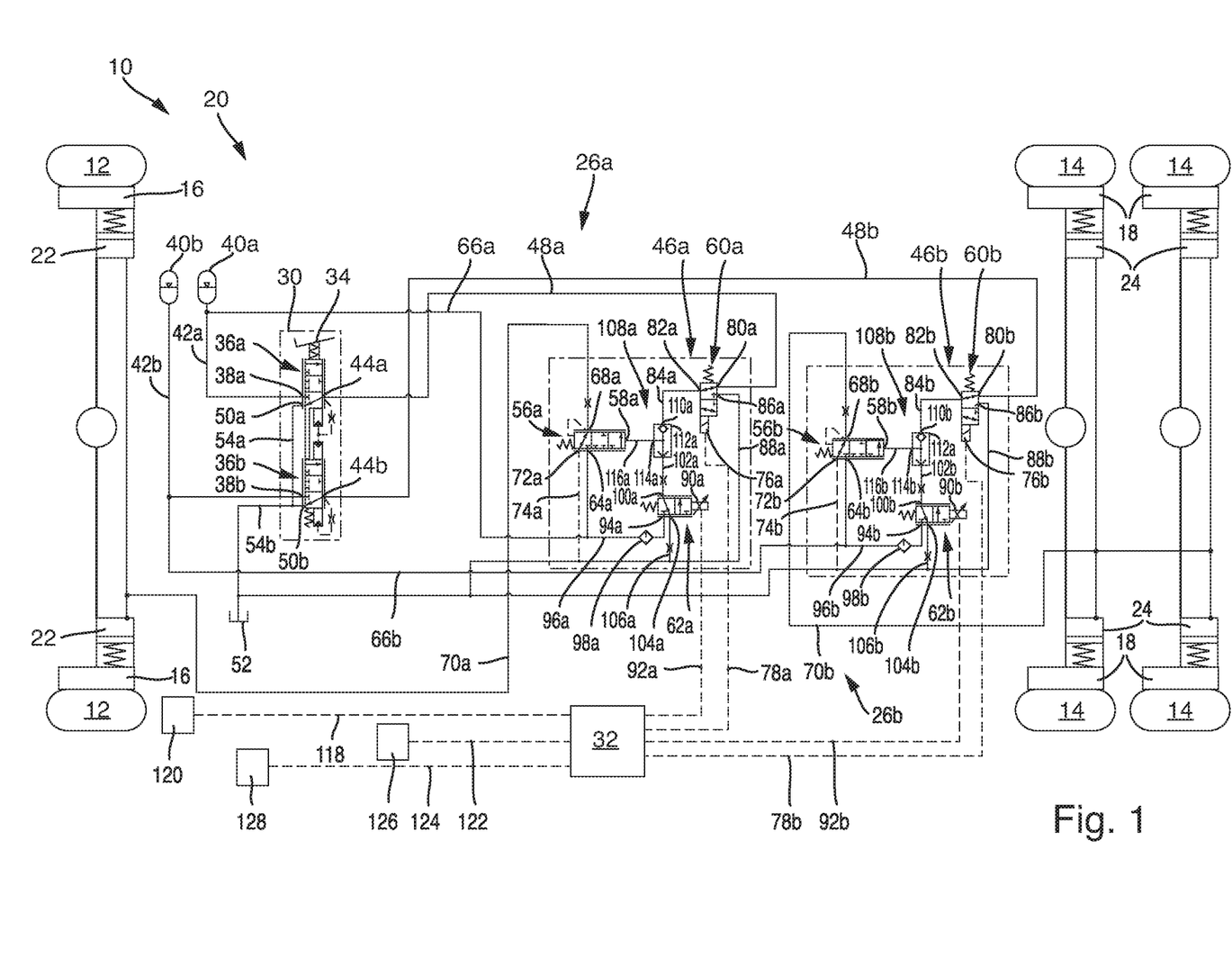
FIG. 1 schematically illustrates a vehicle comprising a brake system according to a first embodiment.

FIG. 1 schematically shows a vehicle 10, in particular a wheeled or an articulated truck, which includes a pair of front wheels 12 and two pairs of rear wheels 14 coupled together by axles and rear differentials. Each front wheel 12 is equipped with a front brake assembly 16 and each rear wheel 14 with a rear brake assembly 18.

The vehicle 10 further comprises a brake system 20 for retarding motion of the vehicle 10 by actuating the front and rear brake assemblies 16, 18 via hydraulically driven front and rear brake actuators 22, 24 associated to the respective brake assemblies 16, 18.

Specifically, the shown brake system 20 constitutes a dual-circuit brake system which is electro-hydraulically actuated. Accordingly, the brake system 20 includes two hydraulic brake circuits 26a, 26b which are hydraulically independent of each other. A first brake circuit 26a is adapted to establish a braking pressure to be applied to the front brake actuators 22, while a second brake circuit 26b is adapted to establish another independent braking pressure to be applied to the rear brake actuators 24. In other words, by being provided with the two hydraulic brake circuits 26a, 26b, the group of front brake assemblies 16 associated to the front wheels 12 and the group of rear brake assemblies 18 associated to the rear wheels 14 can be independently and selectively actuated.

For actuating the brake actuators 22, 24, each one of the first and the second hydraulic brake circuit 26a, 26b can be manually, i.e. hydraulically or hydro-mechanically, actuated by means of a brake pedal assembly 30 and automatically, i.e. electrically or electro-hydraulically, actuated by means of a control unit 32. In this way, the shown brake system 20 constitutes an electro-hydraulic brake system.

By being provided with the control unit 32 for actuating the first and the second hydraulic brake circuit 26a, 26b, the brake system 20 is suitable of being equipped with brake assist functions to support an operator of the vehicle 10 in an automated manner. In the context of the present disclosure, the term "brake assist function" or "brake assist mode" refers to an automatic brake actuation, in which an application or an adjustment of a brake load or a brake pressure is controlled, i.e. automatically controlled, by means of the control unit. Generally, the brake assist mode may constitute at least one of an antilock control mode and a dynamic stability control mode.

Specifically, in the shown brake system 20, the control unit 32 is configured to operate each one of the hydraulic brake circuit 26a, 26b in an antilock control mode and in an automatic retarding control mode. In this way, an antilock function and an automatic retarding control function is implemented in the shown brake system 20, thereby constituting an antilock braking system and an automatic retarding control brake system. In general, antilock braking systems refer to safety anti-skip braking systems for preventing wheels of a vehicle from being locked up during braking, thereby maintaining tractive contact of the wheels with a road surface. Automatic retarding control brake systems are configured for controlling vehicle speed, e.g. on downhill grades, by automatically actuating the vehicle brakes.

Prior to explaining the operation of the control unit 32 in more detail for implementing the above described functions, at first, the structural arrangement of the brake system 20 and its hydraulic brake circuits 26a, 26b are specified in the following.

As set forth above, the brake system 20 comprises the brake pedal assembly 30 for manually operating the first and the second hydraulic brake circuit 26a, 26b. Specifically, the brake pedal assembly 30 comprises a brake pedal 34 constituting a user interface for an operator of the vehicle 10. The brake pedal 34 is spring biased to return to a neutral position in the absence of an external force and mechanically actuates a first and a second brake pedal valve 36a, 36b for regulating a brake pressure to be applied to the respective brake actuators 22, 24. In this configuration, the first brake pedal valve 36a forms a part of the first hydraulic brake circuit 26a and the second brake pedal valve 36b forms a part of the second hydraulic brake circuit 26b.

As regards its structural arrangements, i.e. in view of its installed components, the first and the second hydraulic brake circuit 26a, 26b are similarly structured. Thus, for avoiding a repeated description of elements, like elements of the first and the second hydraulic brake circuit 26a, 26b are indicated by identical reference numerals, while the character "a" identifies the element as being comprised in the first hydraulic brake circuit 26a and the character "b" as being comprised in the second hydraulic brake circuit 26b.

In the following, a hydraulic brake circuit 26 is generically specified, the description of which applies to both the first and the second hydraulic brake circuit 26a, 26b, respectively. In other words, technical features described in connection with the generic hydraulic brake circuit 26 relate and are disclosed for each one of the first and the second hydraulic brake circuit 26a, 26b.

In the hydraulic brake circuit 26, the brake pedal valve 36 is a proportional control valve. Generally, the term "proportional control valve" refers to a valve enabling infinite positioning and thus an infinitely adjustable flow volume and output pressure. Further, the brake pedal valve 36 is a 3/3 center closed proportional control valve, i.e. having three ports and three switching positions. Specifically, the brake pedal valve 36 comprises a first port 38 fluid-communicatively connected to an accumulator 40 via a first pressurized fluid line 42 for receiving pressurized fluid, a second port 44 fluid-communicatively connected to a brake valve unit 46 of the hydraulic brake circuit 26 via a first pressure control line 48 for transmitting pressurized fluid and thus for applying a first control pressure to the brake valve unit 46, and a third port 50 fluid-communicatively connected to a return reservoir 52 via a first dump line 54.

The brake pedal valve 36 can be switched, i.e. infinitely, between an open position, a center close position and a dump position. In the open position of the brake pedal valve 36, a connection between the first and the second port 38, 44 is established for transmitting pressurized fluid from the accumulator 40 into the first pressure control line 48. In the close position, a connection between none of the first, the second and the third port 38, 44, 52 is established, while in the dump position, which is depicted in FIG. 1, a connection between the second port 44 and the third port 50 is established so as to direct pressurized fluid present in the first pressure control line 48 to the return reservoir 52. The brake pedal valve 36 is biased towards its dump position.

The brake valve unit 46 comprises a brake valve 56 for applying pressurized fluid to at least two respective brake actuators 22, 24 in response to a control pressure applied to a hydraulic actuator 58 of the brake valve 56. In this configuration, the control pressure is either supplied or applied by a blocking valve 60 or a brake pressure control valve 62 of the brake valve unit 46, each of which is fluid-communicatively connected to the hydraulic actuator 58 of the brake valve 56.

The brake valve 56, in other words, is a hydraulically actuated by means of the control pressure. Further, the brake valve 56 is a 3/3 center closed proportional control valve, i.e. having three ports and three switching positions. Specifically, the brake valve 56 comprises a first port 64 fluid-communicatively connected to the accumulator 40 by means of a second pressurized fluid line 66 for receiving pressurized fluid, a second port 68 for transmitting pressurized fluid to the respective brake actuators 22, 24 and thus to apply pressurized fluid to the same via a brake line 70, and a third port 72 fluid-communicatively connected to the return reservoir 52 by means of a second dump line 74.

The brake valve 56 can be switched, i.e. infinitely, between an open position, a center close position and a dump position. In the open position of the brake valve 56, a connection between the first and the second port 64, 68 is established for directing pressurized fluid from the accumulator 40 into the brake line 70. In the close position, a connection between none of the first, the second and the third port 64, 68, 72 is established, while in the dump position, which is depicted in FIG. 1, a connection between the second port 44 and the third port 50 is established so as to direct pressurized fluid present in the first pressure control line 48 to the return reservoir 52. The brake valve 56 is biased towards its dump position. In other words, in a state, in which no or merely a small amount of pressure is applied to the hydraulic actuator 58, the brake valve 56 is positioned into its dump position.

Generally, the blocking valve 60 is configured for controlling application of pressurized fluid from the brake pedal valve 36 to the hydraulic actuator 58 of the brake valve 56. The blocking valve is a 3/2 directional control valve, i.e. having three ports and two positions, which is actuated by a solenoid 76 which receives a control signal from the control unit 32 for operating the blocking valve 60. In other words, the blocking valve 60 is electrically actuated by means of the control unit 32. Accordingly, for receiving the control signal, the solenoid 76 is connected to the control unit 32 via a first signal control line 78.

Specifically, the blocking valve 60 comprises a first port 80 fluid-communicatively connected to the second port 44 of the brake pedal valve 36 via the first pressure control line 48, a second port 82 fluid-communicatively connected to the hydraulic actuator 58 of the brake valve 56 via a second control pressure line 84 for applying the first control pressure thereto, and a third port 86 fluid-communicatively connected to the return reservoir 52 via a third dump line 88.

The blocking valve 60 can be switched between an open position, as depicted in FIG. 1, in which a connection between the first and the second port 80, 82 is established for directing pressurized fluid to the hydraulic actuator 58, and a dump position, in which a connection between the second port 82 and the third port 86 is established so as to direct pressurized fluid present in the second pressure control line 84 to the return reservoir 52.

The blocking valve 60 is biased towards its open position. In other words, in a state, in which the solenoid 76 does not receive any control signal from the control unit 32, the blocking valve 60 is positioned into its open position. Thus, the blocking valve 60 is biased towards the open position when no control signals are received from the control unit 32. Upon receiving a control signal, however, the solenoid 76 switches the blocking valve 60 into its dump position in response to the received control signal.

The brake pressure control valve 62 is configured for controlling application of pressurized fluid from the accumulator 40 to the hydraulic actuator 58 of the brake valve 56 initiated by the control unit 32. Specifically, the brake pressure control valve 62 is a 3/2 proportional control valve, i.e. having three ports and two positions, which is actuated by a proportional solenoid 90 which receives a control signal from the control unit 32 for operating the brake pressure control valve 62. In other words, the brake pressure control valve 62 is electrically actuated by means of the control unit 32. Accordingly, for receiving the control signal, the solenoid 90 is connected to the control unit 32 via a second signal control line 92.

Specifically, the brake pressure control valve 62 comprises a first port 94 fluid-communicatively connected to the second pressurized fluid line 66 via a third pressure control line 96. The third pressure control line 96 branches off from the second pressurized fluid line 66. Further, a filter 98 is positioned in the third pressure control line 96. The brake pressure control valve 62 further comprises a second port 100 fluid-communicatively connected to the hydraulic actuator 58 of the brake valve 56 via a fourth control pressure line 102 for applying a second control pressure thereto, and a third port 104 fluid-communicatively connected to the return reservoir 52 via a fourth dump line 106.

The brake pressure control valve 62 can be switched between an open position, in which a connection between the first and the second port 94, 100 is established for directing pressurized fluid to the hydraulic actuator 58, and a dump position, as depicted in FIG. 1, in which a connection between the second port 100 and the third port 104 is established so as to direct pressurized fluid present in the fourth pressure control line 102 to the return reservoir 52. The brake pressure control valve 62 is biased towards its dump position. In other words, in a state, in which the solenoid 90 does not receive any control signal from the control unit 32, the brake pressure control valve 62 is positioned into its dump position. In other words, the brake pressure control valve 62 is biased towards the close position when no control signals are received from the control unit 32. Upon receiving a control signal, however, the solenoid 90 switches the brake pressure control valve 62 into its open position in response to the received control signal.

Further, the brake valve unit 46 comprises a shuttle valve 108 including a first input port 110 connected to the second port 82 of the blocking valve 80 via the second pressure control line 84, a second input port 112 connected to the second port 100 of the brake pressure control valve 62, and an output port 114 connected to the hydraulic actuator 58 of the brake valve 56 via a fifth pressure control line 116.

As set forth above, the brake valve 56 is actuated in response to a control pressure applied to its hydraulic actuator 58. The hydraulic actuator 58 is fluid-communicatively connected to the output port 114 of the shuttle valve 108 which controls the application of control pressure on the hydraulic actuator 58. Specifically, at its first input port 110, the shuttle valve 108 receives the first control pressure applied via the blocking valve 80 and brake pedal valve 46 and, at its second input port 112, receives the second control pressure applied via the brake pressure control valve 62. The shuttle valve 108 is designed and configured such that it selects for its output port 114 the higher of the two control pressures acting on its input ports 110, 112. In other words, the shuttle valve 108 is configured to establish a connection between its output port 114 and the one of the two input ports 110, 112 to which a higher pressure, i.e. control pressure, is applied. Accordingly, the output port 114 and the other one of the two input ports 110, 112, to which a lower pressure is applied, are not in fluid-communicative connection.

In the following, the operation of the control unit 32 is further specified. As set forth above, the control unit 32 is configured to operate the brake system 20 in different operating modes, in dependence of which it influences the actuation of the brake valve unit 46 of the different hydraulic brake circuits 26. For doing so, as described above, the control unit 32 is configured to direct control signals to the brake pressure control valve 62 and the blocking valve 60 so as to actuate their solenoids 76, 90 and thus to control their operation. In this way, the control unit 32 is configured to set the control pressure acting on the brake valve, thereby controlling the operation of the brake actuators 22, 24.

Specifically, the control unit 32 is configured to operate the brake system 20 in the antilock control mode, which constitutes an operating mode of the brake system 20. In this operating mode, the control unit 32 prevents the wheels 12, 14 of the vehicle 10 from being locked up during braking. For doing so, the control unit 32 is configured to switch the blocking valve 60 and/or the brake pressure control valve 62 so as to release control pressure to the brake valve 56 and thus releasing brake pressure acting on the brake actuators 22, 24. In other words, in the antilock control mode, the control unit 32 is configured to actuate the blocking valve 60 and/or the brake pressure control valve 62 so as release pressurized fluid from the hydraulic actuator 58 of the brake valve 56. Specifically, once the wheels are identified as being locked up, the control unit switches the blocking valve 60 into its dump position so as to dump the pressurized fluid acting on the hydraulic actuator 58 of the brake valve 56. In the antilock control mode, the blocking valve 60 will stay in this position while the brake pressure control valve 62 is actuated by the control unit 32 to proportionally control the control pressure applied to the brake valve 56 and thus the brake pressure acting on the brake actuators 22, 24. In this way, the control unit 32 limits wheel slippage to a safe level, while continuing to produce adequate brake torque to decelerate the vehicle 10 as desired by an operator. When the control unit 32 identifies that the vehicle is in a safe and controllable state, the blocking valve 60 will be switched back into its open position.

Specifically, the control unit 32 is configured to operate the brake system 20 in the antilock control mode in dependence on a received input signal, i.e. a wheel speed signal 118. This signal 118 is determined and transmitted to the control unit 32 by a wheel speed sensor 120. More specifically, the wheel speed signal 118 is indicative of a deceleration of the vehicle's wheels 12, 14. Based on the wheel speed signal 118, the control unit 32 is configured to determine whether or not slippage or lockup of any one of the wheels 12, 14 is present and, when wheel slippage is determined, to operate the brake system 20 in the antilock control mode. More specifically, the control unit 32 is configured to determine an actual deceleration of the wheels 12, 14 based on the wheel speed signal 118 and to operate the brake system 20 in the antilock control mode when the determined actual deceleration of the wheels 12, 14 exceeds a predetermined deceleration threshold, which thus constitutes a brake command.

For example, in a state, in which the operator actuates the brake pedal 44, the first control pressure may be applied on the hydraulic actuator 58 of the brake valve 56 transmitted via the blocking valve 60 and the brake pedal valve 46. Accordingly, a brake pressure is applied onto the brake actuators 22, 24 to apply brake to the wheels 12, 14 of the vehicle.

Alternatively or additionally, the brake system 20 may be automatically actuated by the control unit 32, e.g. when the automatic retarding control function is performed.

Specifically, the control unit 32 is configured to operate the brake system 20 in the automatic retarding control mode, which constitutes an operating mode of the brake system 20. In this operating mode, the control unit 32 automatically actuates the brake system 20 for producing a brake pressure to decelerate the vehicle 10 to a commanded desired vehicle or engine speed.

For producing a brake pressure in the automatic retarding control mode, the control unit 32 is configured to operate the brake valve unit such that the brake pressure control valve 62 is switched into its open position, thereby applying control pressure to the hydraulic actuator 58 of the brake valve 56. In this way, brake pressure is provided to and applied on the respective brake actuators 22, 24.

Specifically, the control unit 32 is configured to operate the brake system 20 in the automatic retarding control mode in dependence on a desired speed signal 122 and an actual speed signal 124. The desired speed signal 122 is generated and transmitted by an interface unit 126 for receiving a desired speed value from the operator of the vehicle 10. The actual speed signal 124 is determined and transmitted by a vehicle or engine speed sensor 128 and is indicative of an actual engine speed and/or actual vehicle speed. Based on the signals, the control unit 32 determines an actual speed value and a desired speed value.

For being operated in the automatic retarding control mode, the control unit 32 requires that the value of the determined actual speed is higher than the desired speed. In addition, the control unit 22 requires that the determined deceleration of the wheels 12, 14, which is determined based on the wheel speed signal 118 as described above, falls below the predetermined deceleration threshold. In other words, the control unit 32 is configured to operate the brake system 20 in the automatic retarding control mode when the determined actual speed value is higher than the determined desired speed value and when in particular the determined deceleration falls below the predetermined deceleration threshold.

Figure 2A:
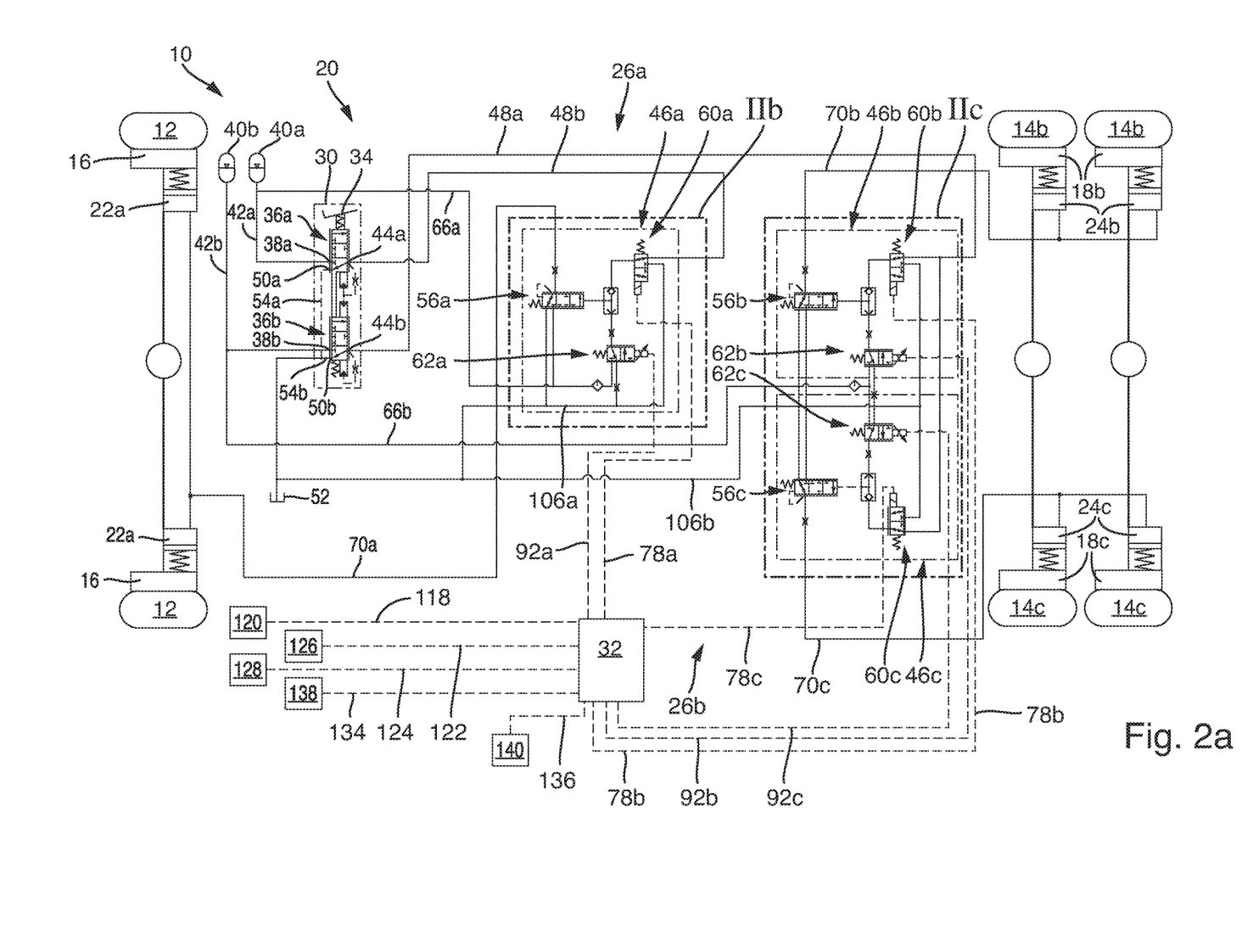
FIG. 2a schematically illustrates a vehicle comprising a brake system according to a second embodiment.
Figure 2B:
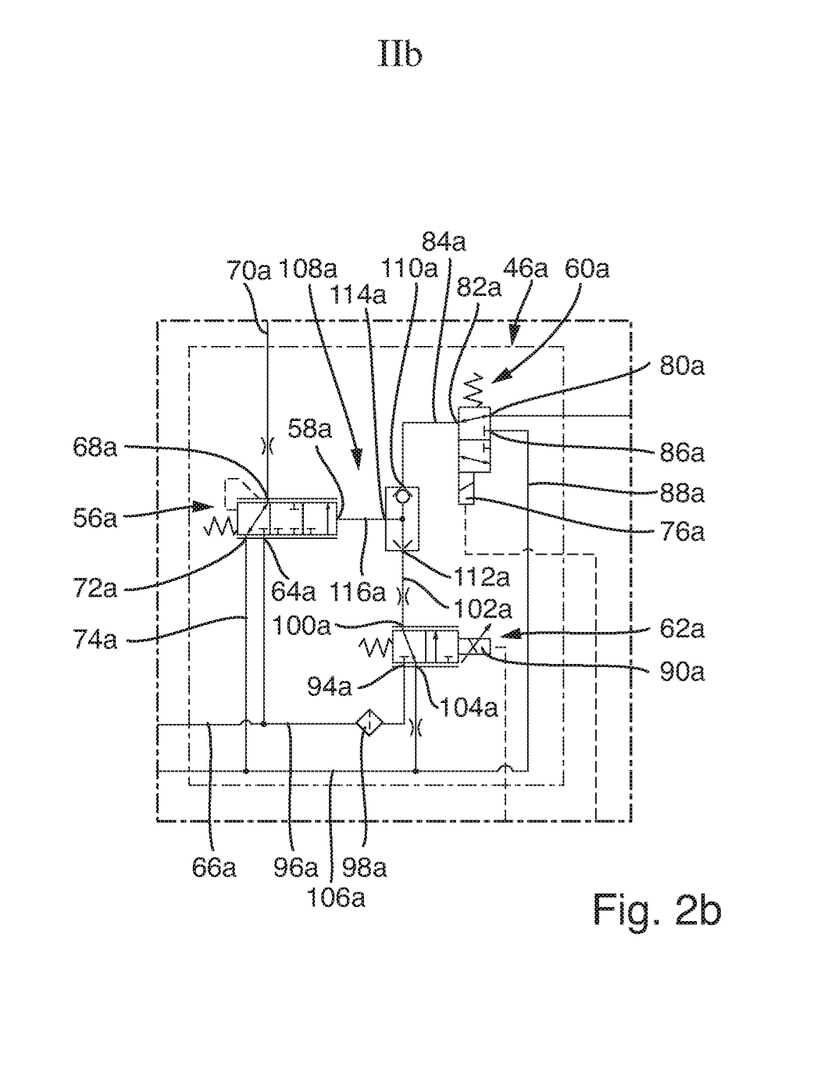
Figure 2C:
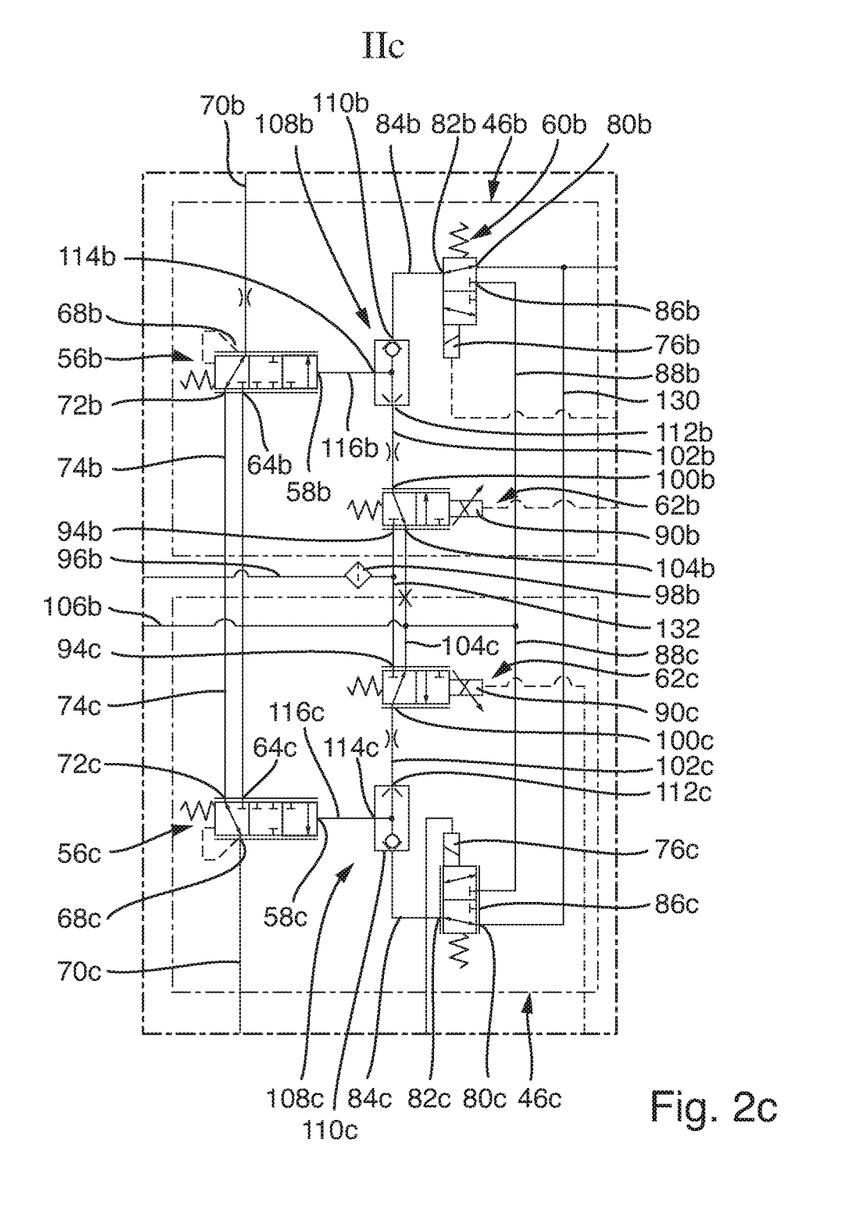

FIGS. 2*a*-*c* schematically shows the vehicle 10 being equipped with a brake system 20 according to another embodiment. Compared to the configuration depicted in FIG. 1, the shown brake system 20 in the second hydraulic brake circuit 26*b* comprises two brake valve units, namely a first brake valve unit 46*b* and a second brake valve unit 46*c*. In the second hydraulic brake circuit 26*b*, the first brake valve unit 26*b* is configured to apply pressure to brake actuators 22*b* associated to rear wheels 14*b* arranged at a right side of the vehicle 10. The second brake valve unit 26*c* is configured to apply pressure to brake actuators 22*c* associated to rear wheels 14*c* arranged at a left side of the vehicle 10. In this way, the shown brake system 20 enables to selectively and independently actuate the group of front brake assemblies 16, the group of right side rear brake assemblies 18*b* and the group of left side rear brake assemblies 18*c*.

By enabling that the brake actuators 24*b*,*c* associated to the right side rear wheels 14*b* and the left side rear wheels 14*c* can be selectively actuated, i.e. independent from one another, the shown brake system 20 is suitable of being equipped with further brake assist functions. Specifically, in addition to the above described antilock control mode and the automatic retarding control mode the control unit 32 is configured to operate the brake system 20 in a dynamic stability control mode for employing a further brake assist function.

Generally, dynamic stability control, also referred to electronic stability control or electronic stability program, refers to an automatically applied brake function to improve vehicle stability, i.e. to avoid over- and/or understeer by individually and unilaterally applying breaking to wheels of a vehicle.

As regards its structural arrangements, i.e. in view of its installed components, the first and the second brake valve unit 46*b*, 46*c* are similarly structured. Thus, for avoiding a repeated description of elements, like elements of the first and the second brake valve unit 46*b*, 46*c* are indicated by identical reference numerals, while the character "b" identifies the element as being comprised in the first brake valve unit 46*b* and the character "c" as being comprised in the second brake valve unit 46*c*.

In the shown brake system 20, the blocking valves 60*b*, 60*c*, i.e. their first ports 80*b*, 80*c*, of both the first and the second control unit 46*b* and 46*c* are each fluid-communicatively connected to the brake pedal valve 36*b*, i.e. the first port 38*b* thereof, via the first pressure control line 48*b*. For doing so, a first junction line 130 branches off from the first pressure control line 48*b* so as to supply pressurized fluid to the first port 80*c* of the blocking valve 60*c* comprised in the second brake valve unit 46*c*.

Further, the brake pressure control valves 62*b*, 62*c*, i.e. their first ports 94*b*, 94*c*, of both the first and the second control unit 46*b* and 46*c* are each fluid-communicatively connected to the accumulator 40*b* via the second pressurized fluid line 66*b* and the third pressure control line 96*b*. For doing so, a second junction line 132 branches off from the third pressure control line 96*b* so as to supply pressurized fluid to the first port 94*c* of the brake pressure control valve 62*c* comprised in the second brake valve unit 46*c*.

In the first brake valve unit 46*b*, the brake valve 56*b* is provided such that its first port 68*b* is fluid-communicatively connected to the right side rear brake actuators 24*b* associated to the rear wheels 14*b* arranged on the right side of the vehicle 10.

In the second brake valve unit 46*c*, the brake valve 56*c* is provided such that its first port 68*c* is fluid-communicatively connected to the left side rear brake actuators 24*c* associated the rear wheels 14*c* arranged on the left side of the vehicle 10.

As set forth above, the control unit 32 is configured to operate the brake system 20 in a dynamic stability control mode. In this operating mode, the control unit 32 is configured to either open the brake pressure control valve 62*b* of the first brake valve unit 46*b* or to open the brake pressure control valve 62*c* of the second control unit 46*c*.

By opening the brake pressure control valve 62*b* of the first brake valve unit 46*b*, a control pressure is applied on the hydraulic actuator 58*b* of the brake valve 56*b*, thereby opening the brake valve 56*b* and thus applying a brake pressure on the right side rear brake actuators 24*b*.

However, by opening the brake pressure control valve 62*c* of the second brake valve unit 46*c*, a control pressure is applied on the hydraulic actuator 58*c* of the brake valve 56*c*, thereby opening the brake valve 56*c* and thus applying a brake pressure on the right side rear brake actuators 24*c*.

Specifically, for deciding which one of the brake pressure control valve 62*b*, 62*c* of the first and the second brake valve unit 46*b*, 46*c* is to be actuated and thus opened, the control unit 32 is configured to take into consideration the wheel speed signal 118, a steering signal 134 and an acceleration signal 136.

More specifically, the wheel speed signal 118 is indicative of a wheel speed of each one of the vehicle wheels 12, 14.

The steering signal 134 is indicative of a demanded steering command which is determined and transmitted to the control unit 32 by a further interface unit 138 configured for receiving a desired steering command from the operator of the vehicle 10.

Further, the acceleration signal 136 is indicative of an actual course or change of course of the vehicle 10 which is determined and transmitted to the control unit 32 by an accelerometer 140.

In other words, the control unit 32 is configured to operate the brake system in the dynamic stability control mode in dependence on the wheel speed signal 118, the steering signal 134 and the acceleration signal 136.

For example, the control unit 32 may be configured to actuate the brake pressure control valve 62b of the first brake valve unit 46b when the wheel speed signal 118 indicates that a deceleration value of the front wheels 12 exceeds the predetermined value, i.e. that that the front wheels slip or have lost traction; when the intended course or intended change of course of the vehicle 10, which is determined based on the steering signal 134, indicates a right turn of the vehicle, and when the intended course or intended change of course of the vehicle does not match to the actual course or actual change of course of the vehicle 10 determined based on the acceleration signal 136.

Accordingly, the control unit 32 may be configured to actuate the brake pressure control valve 62c of the second brake valve unit 46c when the wheel speed signal 118 indicates that a deceleration value of the front wheels 12 exceeds the predetermined value, when the intended course or intended change of course of the vehicle 10 indicates a left turn of the vehicle, and when the intended course or intended change of course of the vehicle 10 does not match to the actual course or actual change of course of the vehicle 10.

In this way, understeer of the vehicle 10 can be avoided. Alternatively or additionally, the brake system 20 may be configured to avoid oversteer of the vehicle 10. For doing so, the first hydraulic break circuit 46a, similar to the above described second hydraulic break circuit 46b, may be equipped with two break valve units configured to independently actuate the break actuators associated to a front left wheel and to a front right wheel.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

Accordingly, a brake system for a vehicle, in particular an articulated vehicle, may be provided. The brake system may comprise a control unit configured to operate the brake system in an automatic retarding control mode and in a brake assist mode; a brake pedal valve; and at least one brake valve unit for actuating at least one brake actuator. The brake valve unit may comprise a brake valve for applying pressurized fluid to the brake actuator in response to a control pressure applied to a hydraulic actuator of the brake valve, a blocking valve for controlling application of pressurized fluid from the brake pedal valve to the hydraulic actuator of the brake valve, and a brake pressure control valve for controlling application of pressurized fluid to the hydraulic actuator of the brake valve.

The proposed brake system enables the implementation of several brake assist functions, i.e. the automatic retarding control function and an antilock function, while being provided with a relatively compact and less complex design. In other words, the structural arrangement of the proposed brake system requires a relatively small amount of components for implementing the automatic retarding control and another brake assist function.

Specifically, the brake assist mode may comprise at least one of an antilock control mode and a dynamic stability control mode.

Generally, the proposed brake system may be used, for example, in an articulated truck or any other truck or work vehicle, but is not limited thereto. Rather, the brake system may be used in any application for applying brake to a wheel of a vehicle.

Specifically, the control unit may be configured for manipulating the control pressure applied to the hydraulic actuator of the brake valve so as to control the actuation of the brake system. For doing so, the control unit may be configured to control the operation of at least one of the blocking valve and the brake pressure control valve.

For example, the control unit may be configured to actuate the blocking valve so as to block or cut off application of pressurized fluid from the brake pedal valve to the hydraulic actuator of the brake valve. Further, the control unit may be configured to actuate the brake pressure control valve for controlling application of pressurized fluid from an accumulator storing pressurized fluid to the hydraulic actuator of the brake valve.

More specifically, the brake assist mode may comprise at least the antilock control mode, in which the control unit may be configured to actuate at least one of the blocking valve and the brake pressure control valve so as to release pressurized fluid from the hydraulic actuator of the brake valve.

For deciding whether the brake system is to be operated in the antilock control mode or not, the control unit may be configured to determine wheel slippage of the vehicle wheels. This may be performed in dependence on a signal being indicative of deceleration of vehicle's wheels, to which brake may be applied by means of the break actuators. In other words, the control unit may be configured to operate the brake system in the antilock control mode in dependence on a received wheel speed signal being indicative of a deceleration of a wheel of the vehicle.

Specifically, the control unit may be configured to determine a deceleration of at least one vehicle wheel based on the received wheel speed signal. Further, the control unit may be configured to operate the brake system in the antilock control mode when the determined deceleration of the wheel exceeds a predetermined deceleration threshold.

Further, as set forth above, the brake system may be operated in the automatic retarding control mode. In this operating mode of the brake system, the control unit may be configured to actuate the brake pressure control valve so as to apply pressurized fluid to the hydraulic actuator of the brake valve. In this way, a control pressure is applied to the hydraulic actuator of the brake valve which may cause the brake valve to open, thereby applying pressurized fluid and thus a brake pressure on the brake actuators. Accordingly, by actuating the brake pressure control valve by means of the control unit, the proposed brake system enables to automatically and/or electrically actuate the brake system, thereby enabling the implementation of the automatic retarding control function.

For deciding whether the brake system is to be operated in the automatic retarding control mode or not, the control unit may be configured to determine an actual vehicle or engine speed and a desired or intended vehicle speed. Specifically, when the control unit determines that the actual vehicle speed is higher compared to the desired vehicle speed, it may initiate the automatic retarding control mode or operate the brake system in the same. However, the brake system may not be operated in the automatic retarding control mode, when a wheel slippage is determined by the control unit. Thus, the control unit may be configured to operate the brake system in the automatic retarding control mode in dependence on the received wheel speed signal and a determined brake command. For example, the control unit may be configured to determine the brake command based on a received desired speed signal and a received actual speed signal. Specifically, based on these signals, the control unit may determine an actual engine or vehicle speed. When the determined actual speed is higher compared to the desired speed, a brake command is determined.

Specifically, the control unit may be configured to operate the brake system in the automatic retarding control mode when the determined deceleration of the wheel falls below the predetermined deceleration threshold and when a brake command is determined, i.e. when the determined actual speed is higher compared to the desired speed.

Further, in the proposed brake system, the brake pedal valve may be a proportional control valve including a first port fluid-communicatively connected to an accumulator for receiving pressurized fluid and a second port fluid-communicatively connected to the brake valve unit, in particular to the blocking valve. The brake pedal valve may be comprised in a pedal assembly comprising a brake pedal for actuating the brake pedal valve. The pedal assembly may comprise more than one brake pedal valve, each of which may be provided to control the flow of pressurized fluid to one brake valve unit. Accordingly, the number of brake pedal valves may correspond to a number of brake valve units provided in the brake system.

As set forth above, the blocking valve may be operated or actuated by the control unit. In other words, the blocking valve may be an electrically actuated valve. Accordingly, the blocking valve may be a solenoid valve including a solenoid for actuating the same. The solenoid may be connected to the control unit by means of a control signal line, via which the control unit may direct control signals to the blocking valve so as to control the operation thereof.

Further, the blocking valve may include a first port fluid-communicatively connected to the brake pedal valve, in particular the second port of the brake pedal valve, and a second port fluid-communicatively connected to the hydraulic actuator of the blocking valve. The blocking valve may be switched between an open position, in which a connection between the first and the second port is established, and a close position, in which the connection between the first and the second port is decoupled or interrupted. The blocking valve may be a normally opened valve, i.e. may be biased towards its open position. The solenoid may be configured such that, in response of a control signal received from the control unit, it positions the blocking valve into its close position. However, when the solenoid does not receive a control signal from the control unit, the blocking valve may be positioned into its open position.

As set forth above, the brake pressure control valve may be operated or actuated by the control unit. In other words, the brake pressure control valve may be an electrically actuated valve. Accordingly, the brake pressure control valve may be a solenoid valve, i.e. a proportional solenoid valve, including a solenoid, i.e. a proportional solenoid, for actuating the same. The solenoid may be connected to the control unit by means of a control signal line, via which the control unit may direct control signals to the blocking valve so as to control the operation thereof. In other words, the brake pressure control valve may be a proportional control valve.

Further, the brake pressure control valve may include a first port fluid-communicatively connected to an accumulator and a second port fluid-communicatively connected to the hydraulic actuator of the brake valve. The brake pressure control valve may be switched between an open position, in which a connection between the first and the second port is established, and a close position, in which the connection between the first and the second port is decoupled or interrupted. The brake pressure control valve may be a normally closed valve, i.e. may be biased towards its close position. The solenoid may be configured such that, in response of a control signal received from the control unit, it positions, i.e. infinitely, the blocking valve into its open position. However, when the solenoid does not receive a control signal from the control unit, the blocking valve may be positioned into its close position.

In a further development, the brake valve unit may further comprise a shuttle valve. The shuttle valve may include an output port fluid-communicatively connected to the hydraulic actuator of the brake valve, a first input port fluid-communicatively connected to the blocking valve, in particular its second port, and a second input port fluid-communicatively connected to the brake pressure control valve, in particular its second port.

The proposed brake system may comprise merely one brake valve unit. Alternatively, the proposed brake system may comprise more than one brake valve unit, e.g. two or three or more than three brake valve units.

For example, in a configuration of the brake system having two brake valve units, a first brake valve unit may be configured to actuate a first brake actuator configured to being connected to a first brake assembly for retarding at least one first wheel of the vehicle and a second brake valve unit may be configured to actuate a second brake actuator configured to being connected to a second brake assembly for retarding at least one second wheel of the vehicle. In particular the first and the second wheel may be arranged on opposed sides of the vehicle. For example, the first wheel may be a rear wheel arranged on a right side of the vehicle and the second wheel may be a rear wheel arranged on a left side of the vehicle. Alternatively or additionally, the first wheel may be a front wheel arranged on a right side of the vehicle and the second wheel may be a front wheel arranged on a left side of the vehicle.

Alternatively or additionally, the brake assist mode may comprise at least a dynamic stability control mode, and when operating the brake system in the dynamic stability control mode, the control unit is configured to either actuate a first brake pressure control valve of the first brake valve unit to supply pressurized fluid to a hydraulic actuator of a first brake valve of the first brake valve unit or to actuate a second brake pressure control valve of the second brake valve unit to supply pressurized fluid to a hydraulic actuator of a second brake valve of the second brake valve unit.

Specifically, the control unit may be configured to determine which one of the first and the second brake pressure control valve is to be actuated in dependence on a wheel speed signal being indicative of a deceleration of the first and the second vehicle wheel, a steering signal being indicative of an intended course or an intended change of course of the vehicle and an acceleration signal being indicative of an actual course or and actual change of course of the vehicle.

Further, a vehicle, in particular an articulated vehicle, may be provided which is equipped with an above described break system.

INDUSTRIAL APPLICABILITY

With reference to the Figures and in operation, a brake system 20 capable of performing several brake assist functions in a vehicle is suggested. The brake system 20 as mentioned above is applicable in vehicles and especially articulated vehicles 10. It may replace conventional break systems and may serve as a replacement or retrofit part.

What is claimed is:

1. A brake system for a vehicle, the vehicle having at least a pair of wheels, the brake system comprising:
   a brake actuator associated with each wheel;
   a hydraulic brake circuit associated with the brake actuators, the hydraulic brake circuit comprising:
      a brake pedal valve configured to receive a brake input from an operator;
      at least one brake valve unit for actuating the brake actuators, the at least one brake valve unit comprising:
         a brake valve configured to selectively apply pressurized fluid to the brake actuators in response to a control pressure applied to a hydraulic actuator of the brake valve,
         a blocking valve for selectively controlling application of pressurized fluid from the brake pedal valve to the hydraulic actuator of the brake valve, the blocking valve having an open position, in which the brake pedal valve fluidly communicates with the hydraulic actuator of the brake valve through the blocking valve, and a dump position, and
         a brake pressure control valve for controlling application of pressurized fluid to the hydraulic actuator of the brake valve, the brake pressure control valve having an open position, in which the brake pressure control valve communicates pressurized fluid to the hydraulic actuator of the brake valve, and a closed position, in which the brake pressure control valve blocks pressurized fluid to the hydraulic actuator of the brake valve;
   a first sensor configured to determine an actual wheel speed of at least one of the pair of wheels and generate an actual wheel speed signal;
   a second sensor configured to determine a speed of the vehicle or an engine of the vehicle and generate an actual speed signal;
   an interface unit configured to receive a desired speed value from the operator and generate a desired speed signal; and
   a control unit operatively coupled to the first sensor, the second sensor, the interface unit, the blocking valve, and the brake pressure control valve, the control unit being programmed to:
      determine an actual wheel deceleration based on the actual wheel speed signal;
      when the actual wheel deceleration exceeds a predetermined deceleration threshold, operate the at least one brake valve unit in an antilock control mode by actuating the blocking valve to the dump position and by actuating the brake pressure control valve to proportionally control application of pressurized fluid to the hydraulic actuator of the brake valve; and
      when both the actual wheel deceleration is less than the predetermined deceleration threshold and the actual speed signal exceeds the desired speed signal, operate the at least one brake valve unit in an automatic retarding control mode by operating the brake pressure control valve in the open position.

2. The brake system according to claim 1, wherein the control unit is configured to actuate the brake pressure control valve for controlling application of pressurized fluid from an accumulator storing pressurized fluid to the hydraulic actuator of the brake valve.

3. The brake system according to claim 1, wherein the brake pedal valve is a proportional control valve including a first port fluid-communicatively connected to an accumulator for receiving pressurized fluid and a second port fluid-communicatively connected, to the blocking valve.

4. The brake system according to claim 1, wherein, the blocking valve is a solenoid valve including a first port fluid-communicatively connected to the brake pedal valve, and a second port fluid-communicatively connected to the hydraulic actuator of the brake valve.

5. The brake system according to claim 1, wherein the brake pressure control valve is a proportional control valve.

6. The brake system according to claim 1, wherein the brake pressure control valve includes a first port fluid-communicatively connected to an accumulator and a second port fluid-communicatively connected to the hydraulic actuator of the brake valve.

7. The brake system according to claim 1, wherein the at least one brake valve unit further comprises a shuttle valve including an output port fluid-communicatively connected to the hydraulic actuator of the brake valve, a first input port fluid-communicatively connected to the blocking valve, and a second input port fluid-communicatively connected to the brake pressure control valve.

8. The brake system according to claim 1, which comprises two brake valve units, wherein a first brake valve unit is configured to actuate a first brake actuator connected to a first brake assembly for retarding at least one first wheel of the vehicle, and a second brake valve unit configured to actuate a second brake actuator connected to a second brake assembly for retarding at least one second wheel of the vehicle, wherein the first and the second wheel are arranged on opposed sides of the vehicle.

9. The brake system according to claim 8, wherein the control unit further is programmed to operate the two brake valve units in a dynamic stability control mode, and when operating the brake system in the dynamic stability control mode, the control unit is configured to either actuate a first brake pressure control valve of the first brake valve unit to supply pressurized fluid to a hydraulic actuator of a first brake valve of the first brake valve unit or to actuate a second brake pressure control valve of the second brake valve unit to supply pressurized fluid to a hydraulic actuator of a second brake valve of the second brake valve unit.

10. The brake system according to claim 9, wherein the control unit is configured to actuate a selected one of the first and second brake pressure control valves based on a further input signal comprising at least one of a wheel speed signal being indicative of a deceleration of the first and the second vehicle wheel, a steering signal being indicative of an intended course of the vehicle and an acceleration signal being indicative of an actual course of the vehicle.

11. A vehicle, in particular a wheeled vehicle, comprising a brake system according to claim 1.

* * * * *